No. 699,955. Patented May 13, 1902.
F. HUFF.
MEASURING APPARATUS.
(Application filed Sept. 30, 1901.)
(No Model.) 2 Sheets—Sheet 1.

Witnesses
Alfred A. Eicker
John D. Rippey

Inventor
Frank Huff.
by Higdon and Longan Atty's.

No. 699,955. Patented May 13, 1902.
F. HUFF.
MEASURING APPARATUS.
(Application filed Sept. 30, 1901.)
(No Model.) 2 Sheets—Sheet 2.

Witnesses: Inventor
Alfred W. Eicher Frank Huff.
John W. Rippey By Higdon and Longan Atty's.

UNITED STATES PATENT OFFICE.

FRANK HUFF, OF ST. LOUIS, MISSOURI.

MEASURING APPARATUS.

SPECIFICATION forming part of Letters Patent No. 699,955, dated May 13, 1902.

Application filed September 30, 1901. Serial No. 77,070. (No model.)

*To all whom it may concern:*

Be it known that I, FRANK HUFF, of the city of St. Louis, State of Missouri, have invented certain new and useful Improvements in Measuring Apparatus, of which the following is a full, clear, and exact description, reference being had to the accompanying drawings, forming a part hereof.

This invention relates to a measuring apparatus; and it consists of the novel construction, combination, and arrangement of parts hereinafter shown, described, and claimed.

The object of this invention is to provide an apparatus for measuring liquids and consisting of a receptacle into which the liquids are admitted and a piston or movable partition within the receptacle and connected to a suitable indicator whereby the quantity or amount of liquid within the receptacle will be indicated when the partition or piston is moved.

My invention consists of a measuring apparatus comprising a suitable storage-tank, a measuring-receptacle connected to the storage-tank, so that liquid will run from the tank into the receptacle, a valve controlling the passage from the tank to the measuring-receptacle, a vent-pipe extending upwardly from the measuring-receptacle to a level with the top of the storage-tank, a piston mounted in the measuring-receptacle, a piston-rod extending from the piston through the head of the receptacle, cross-arms fixed upon the outer end of the piston-rod, connecting-rods extending forwardly from the ends of the cross-arms, a transversely-extending shaft mounted above the forward end of the receptacle, a crank-arm extending from each end of said shaft and connected to the forward ends of said connecting-rods, an indicator-plate extending upwardly from the forward end of the receptacle in front of the storage-tank, a crank-arm extending from the center of said shaft through a slot in said indicator-plate, a wheel mounted in front of said indicator-plate, a crank-pin carried by said wheel, a connecting-rod connecting the crank-arm to said crank-pin, as required, to reciprocate the piston in the measuring-receptacle by the rotation of said wheel, an indicator or dial upon said indicator-plate, and a finger carried by said wheel and pointing to said dial, as required, to indicate the amount of liquid in said measuring-receptacle.

Figure 1:
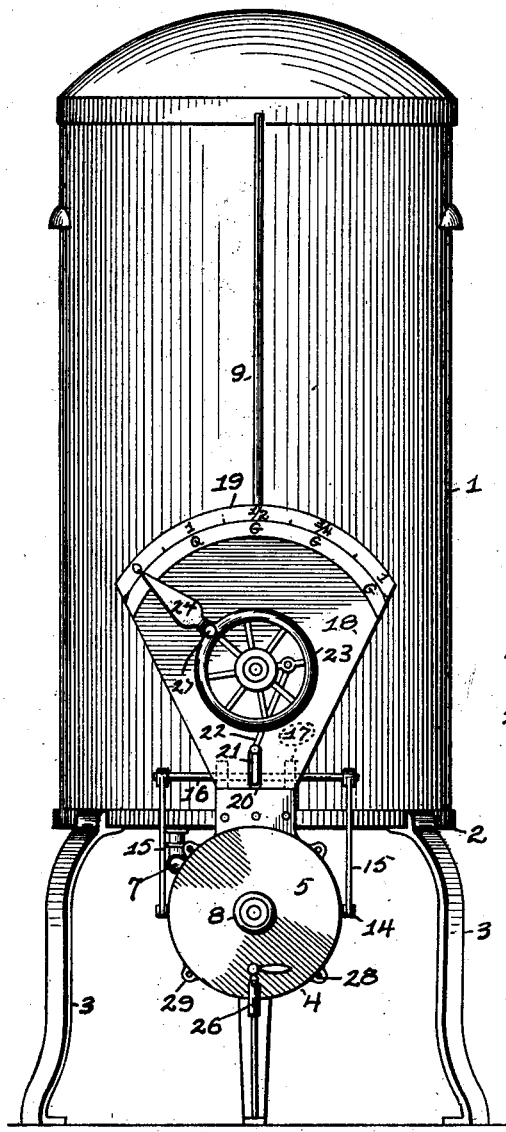
Figure 2:
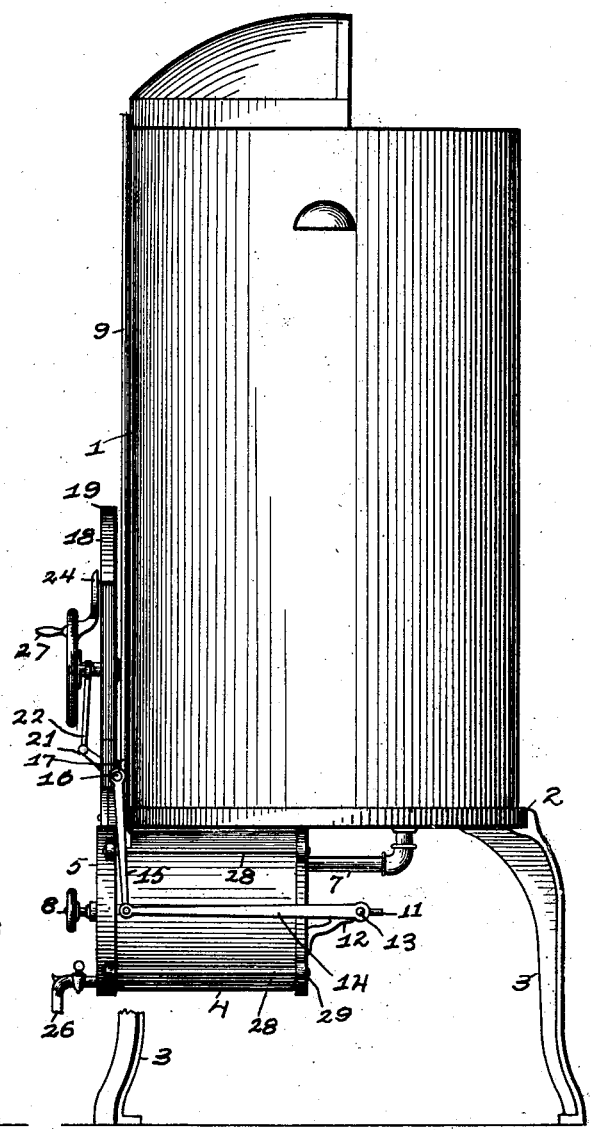
Figure 3:
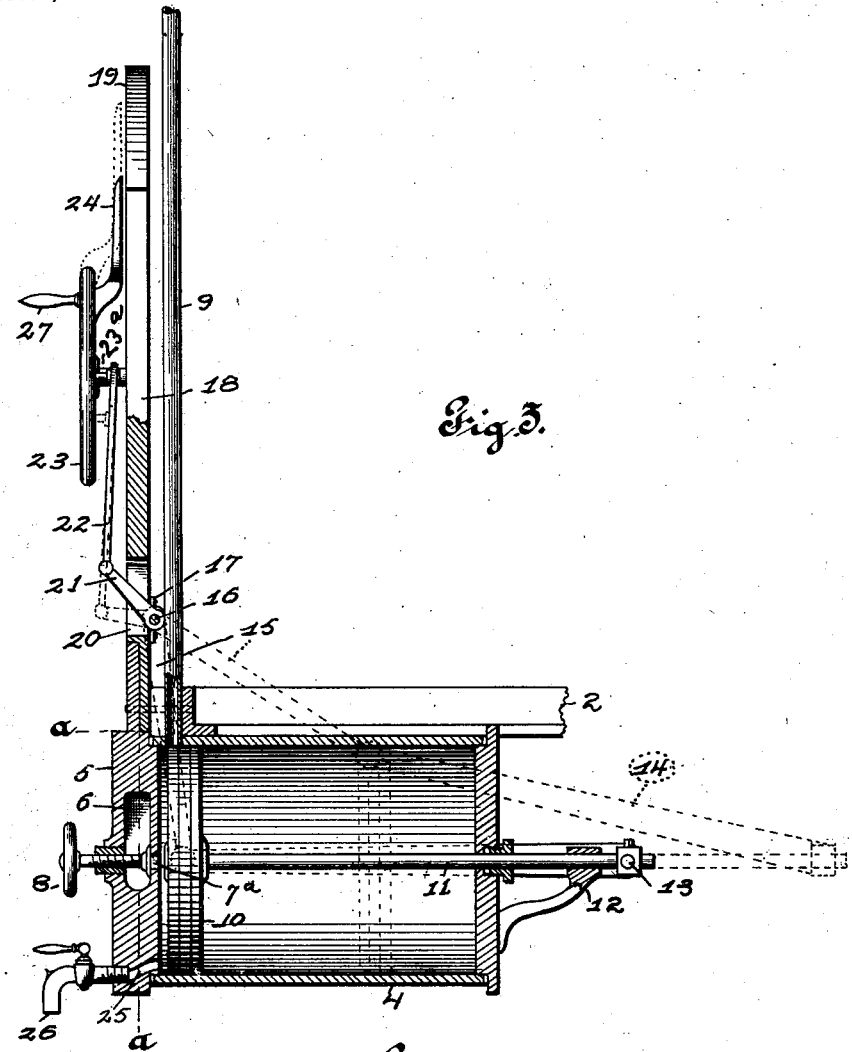
Figure 4:
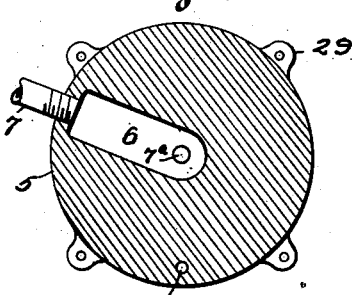

Figure 1 is a front view of the measuring apparatus. Fig. 2 is a side elevation. Fig. 3 is a sectional view showing the measuring-tank, and Fig. 4 is a sectional view taken on the line *a a* of Fig. 3.

1 indicates the tank in which liquids are stored and which is mounted or carried by the support 2, upheld by the legs 3.

4 indicates the measuring-receptacle, which is supported below or adjacent to the tank 1 and into which the liquids are admitted to be measured. The said receptacle 4 is provided with a front end 5, which is connected in any suitable manner to the base or support 2, thereby upholding the front end of the said receptacle 4. The said end 5 is provided with an opening or passage-way 6, into which the pipe 7 leads, thereby connecting the said opening or passage-way with the tank 1. An opening $7^a$ leads from the passage-way 6 into the receptacle 4, and the passage of the liquid through the said opening is controlled by means of an ordinary hand-valve 8. It will thus be seen that there is a connection between the tank 1 and the receptacle 4 and that the liquid can be admitted into the said receptacle 4 as desired by operating the valve 8 to open or close the opening $7^a$.

The receptacle 4 may be of any desired size to measure liquids into various quantities, and as the liquid is admitted into the said receptacle it is necessary that the same be allowed to pass therefrom, and for this purpose I provide a pipe 9, extending upwardly from the upper side of the receptacle 4 and terminating near the upper end of the tank 1, so that no liquid can escape through the said pipe whenever the valve 8 is opened to permit the receptacle 4 to be entirely filled by liquid from the said tank 1. Within the receptacle 4 is located a movable piston or partition 10, which normally rests near the front end of the receptacle, as shown in Fig. 3, but is operated or moved therein by the pressure of the liquid whenever the latter is admitted from the tank 1 through the pipe 7 and the opening $7^a$.

11 indicates a rod which is connected to the rear side of the movable piston or partition 10 and which operates through an opening in the rear end of the receptacle 4 and is supported or guided within the bearing 12, connected to the rear end of the said receptacle 4. Air may be admitted to the rear end of the piston-chamber or measuring-receptacle by mounting the piston-rod 11 loosely in its bearing or in any suitable way.

13 indicates a rod which is attached to the rear end of the rod 11 and which projects laterally beyond the sides of the receptacle 4, and to the ends of the said rod 13 are attached the rods or arms 14, which extend forwardly to near the front end of the receptacle 4 and are pivoted to the arms 15, the upper ends of which are connected to the horizontal rod 16. The said rod 16 is supported in bearings 17 and is turned therein whenever the piston 10 is operated or moved within the receptacle 4.

18 indicates a plate which is connected to the front end 5 of the receptacle 4 and projects upwardly in front of the tank 1, and formed around the upper edge of the said plate is a graduated plate 19. A slot or opening 20 is formed in the plate 18 in front of the rod 16, and an arm 21, connected to the said rod 16, projects through the said slot 20 and has its forward end connected to a rod 22, the upper end of which is connected to a crank-pin 23$^a$, carried by the wheel 23, supported in front of the plate 18. A pointer 24 is rigid with the wheel 23 and operates over the graduated scale 19, thereby indicating the amount of liquid which is contained within the receptacle 4. An outlet 25 is formed at the front end of the said receptacle 4 and is controlled by the faucet 26. A handle 27 may be formed rigid with the wheel 23, so that it and the other operating parts can be returned to their normal positions after they have been operated by the admission of the liquid into the receptacle 4. The ends of the receptacle 4 are connected together and are held rigidly in position by means of the rods 28, which extend through openings formed in integral lugs or ears 29, formed on the ends of the said receptacle.

The operation of the device is as follows: Liquid is admitted into the receptacle through the pipe 7 and the passage-way 6, the valve 8 controlling the passage of the liquid through the opening 7$^a$. Before the liquid is admitted into the receptacle 4 the piston 10, which is normally located at the front end of the receptacle 4, is forced rearwardly by turning the wheel 23. The rods or connections 14 will also be operated, and the rod 16 will be oscillated in the bearings in which it is supported. The connections 21 and 22, leading from the wheel 23 to the rod 16, will be moved, and the said rod and the piston will be operated, and the piston will determine the amount of liquid which can be admitted into the receptacle. By adjusting the indicator 24 the operator can readily determine the amount of liquid which can enter the receptacle, and when the required amount has been admitted thereinto the valve 8 can be closed to prohibit further passage of liquid. After closing the valve 8 the liquid may be drawn out of the receptacle through the outlet-faucet 26, and the parts can then be returned to their normal positions by operating the wheel 23, which will, through the connections above described, move the piston 10 back to its normal position in the front end of the receptacle.

I have shown the device applied to one tank; but it is manifest that there may be pipes leading from various tanks and all may make use of the same measuring device.

The receptacle 4 may be made in any desired size to measure liquids into any quantities, and the apparatus will be found of great convenience in measuring liquids at the same time they are drawn out of the tank within which they are contained.

I claim—

1. In a measuring apparatus, a suitable tank; a measuring-receptacle mounted below the tank; a connection between the tank and the measuring-receptacle so that liquid will run from the tank into the receptacle; a valve controlling the said connection; a piston mounted in said receptacle; a piston-rod extending from said piston through the head of said receptacle; cross-arms mounted on the rear end of said piston-rod outside of the receptacle; connecting-rods extending from the ends of said cross-arms forwardly; a shaft mounted above the forward end of said receptacle; crank-arms extending from the ends of said shaft and connected to the forward ends of said connecting-rods; an indicator-plate extending upwardly from the forward end of said receptacle in front of the storage-tank; a wheel mounted in front of said indicator-plate; a crank-pin carried by said wheel; a crank-arm extending from the center of said shaft; and a connecting-rod connecting said crank-pin to said crank-arm, as required to reciprocate the piston by the rotation of the wheel, or as required to rotate the wheel when liquid is admitted to the measuring-receptacle and operates the piston, substantially as specified.

2. In a measuring apparatus, a suitable tank; a measuring-receptacle mounted below the tank; a connection between the tank and the measuring-receptacle, so that liquid will run from the tank into the receptacle; a piston in said measuring-receptacle; a piston-rod extending from the piston through the head of the receptacle; cross-arms mounted upon the outer end of the piston-rod; connecting-rods extending forwardly from the ends of the cross-arms; a shaft mounted above the measuring-receptacle in front of the storage-tank; crank-arms extending from the ends of said shaft and connected to the forward ends of said connecting-rods; an indicator mounted in front of the storage-tank; an indicator-wheel mounted in front of the indicator, and having a finger pointing to the indicator; a crank-pin carried by the wheel; a crank-arm extending forwardly from the shaft; and a connecting-rod connecting the crank-pin to the crank-arm, as required to move the indicator when liquid is admitted to the measuring-receptacle to operate the piston, substantially as specified.

In testimony whereof I affix my signature in presence of two witnesses.

FRANK HUFF.

Witnesses:
　ALFRED A. EICKS,
　JOHN D. RIPPEY.